United States Patent
Wilson et al.

[15] 3,697,810
[45] Oct. 10, 1972

[54] ELECTRICAL APPARATUS INCLUDING INTERLOCKING CIRCUIT FOR GROUND FAULT SENSOR

[72] Inventors: John I. Wilson; Wardell Gary, both of Beaver, Pa.

[73] Assignee: Westinghouse Electric Corporation, Pittsburgh, Pa.

[22] Filed: Aug. 30, 1971

[21] Appl. No.: 176,115

[52] U.S. Cl..............317/18 D, 317/27 R, 317/28 R, 317/29 R, 317/335 C, 317/36 TD
[51] Int. Cl..............................H02h 1/02, H02h 7/26
[58] Field of Search.....317/18 D, 335 C, 27 R, 28 R, 317/29 R, 36 TD; 307/294

[56] References Cited

UNITED STATES PATENTS

| | | | |
|---|---|---|---|
| 3,539,866 | 11/1970 | Stevenson | 317/18 D |
| 3,558,981 | 1/1971 | Zocholl | 317/335 C |
| 3,496,417 | 2/1970 | Tenenbaum | 317/36 TD |
| 3,273,017 | 9/1966 | Mathews | 317/29 R |

*Primary Examiner*—J. D. Miller
*Assistant Examiner*—Harvey Fendelman
*Attorney*—A. I. Stratton et al.

[57] ABSTRACT

A ground fault sensor circuit adapted to provide output signals and receive input signals as part of an overall ground fault detection system including a plurality of such ground fault sensor or detector circuits, associated circuit interrupters and current monitors. The sensors are adapted to be electrically interlocked so any or all of them may be completely disabled from actuating an associated circuit breaker or may actuate a circuit breaker instantaneously depending upon the presence or absence of an input signal or may provide an output signal to actuate other ground fault sensors or give indications of predetermined operating conditions.

14 Claims, 5 Drawing Figures

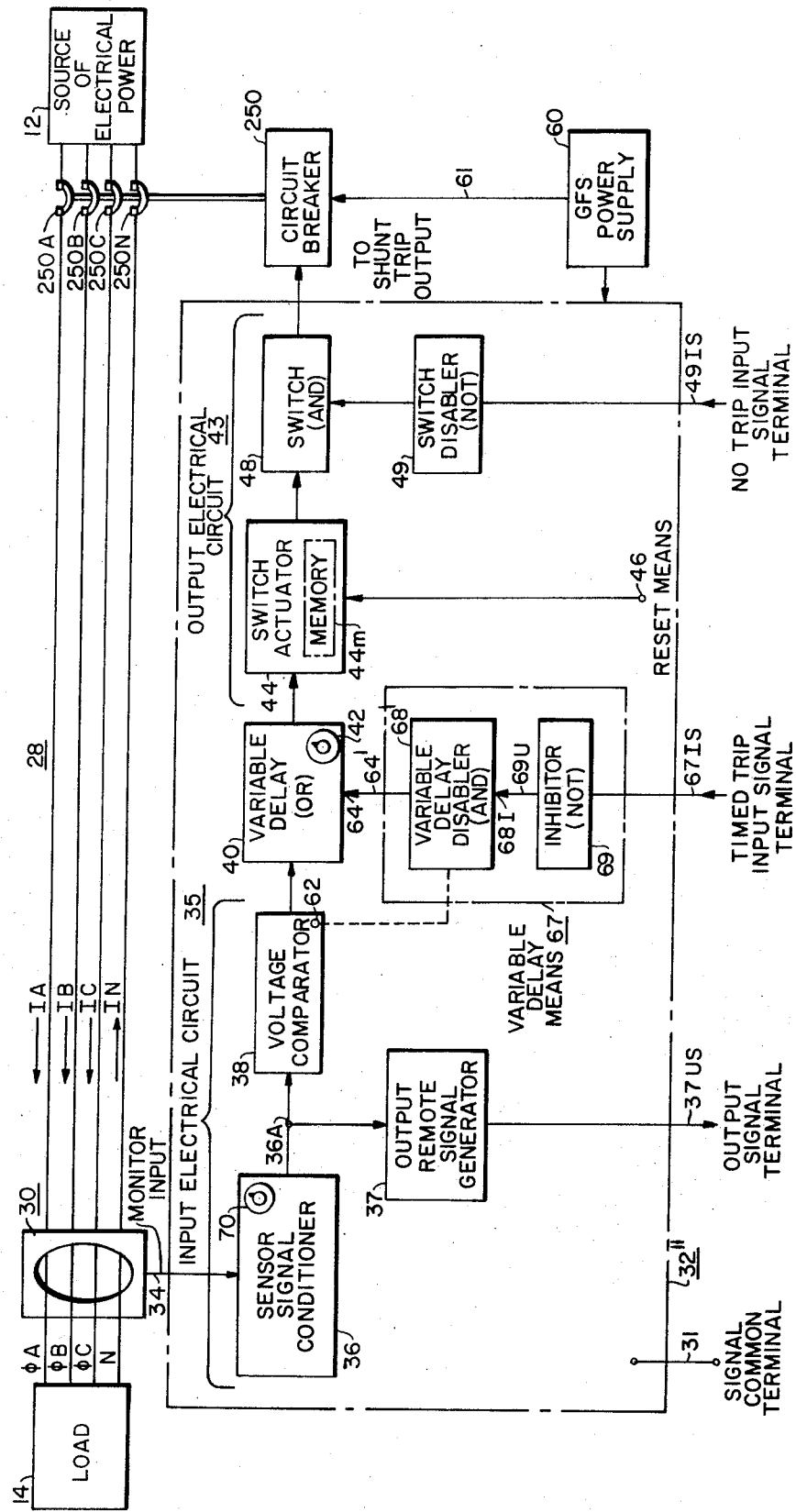
FIG. I

ELECTRICAL APPARATUS INCLUDING INTERLOCKING CIRCUIT FOR GROUND FAULT SENSOR

CROSS-REFERENCES TO RELATED APPLICATIONS

Certain inventions related to those disclosed in the present application are disclosed and claimed in copending applications, Ser. No. 175,880 (W.E. Case No. 42,729) filed concurrently by G. Watson and M. B. Breenen and Ser. No. 176,114 (W.E. Case No. 42,111) filed concurrently by J. T. Wilson which are both assigned to the same assignee as the assignee of the present application.

BACKGROUND OF THE INVENTION

This invention relates to ground fault sensor or detector circuit and it has particular relationship to ground fault detector circuits which form part of a ground fault detecting system wherein each ground fault detector circuit has input and output capabilities which cooperate with those of the other detector circuits.

Known types of ground fault sensors normally function relatively independently of other ground fault sensors in the same electrical transmission or distribution system. The only coordination or interrelation between the operation of the various sensors (and their associated circuit breakers) in the system may be the preset or predetermined time delays provided on each of the ground fault sensors in the system. In such cases, one ground fault detector or sensor may cause a tripping operation of its associated circuit breaker before another detector. It would be advantageous to have a means of transmitting or communicating by interlocking circuits the operating status of each ground fault detector to others in the same system. More specifically, ground fault detectors with input and output terminals adapted to be interconnected with other associated ground fault detectors in an overall system of ground fault detectors would be desirable.

SUMMARY OF THE INVENTION

In accordance with the present invention, a circuit is provided in a ground fault sensor, such as the general type disclosed in copending applications, Ser. Nos. 176,114 and 175,880 (W.E. Case Nos. 42,111 and 42,729) which is capable of providing an output signal to a remote monitor or to another ground fault detector or sensor which may be part of a protective system including a plurality of such ground fault sensors. This signal may be provided when the initial ground fault sensor or any one of the associated sensors in the system is actuated by or responds to the presence of one or more ground fault currents in the protected electrical circuit.

In addition, each ground fault sensor is adapted to receive signals at two different sets of input terminals. The input terminals are adapted to receive the type of output signals generated by the previously mentioned output circuitry of the associated ground fault sensors. One of these input signals may be used to change the mode of operation of a ground fault sensor from a time delayed trip actuation to an instantaneous trip actuation such as the type specifically described in copending application, Ser. No. 176,114 (W.E. Case No. 42,111). Another signal may completely inhibit the tripping of the associated circuit breaker controlled by a particular ground fault detector regardless of any other operating response which may occur in the controlling ground fault sensor.

BRIEF DESCRIPTION OF THE DRAWINGS

For a better understanding of the invention, reference may be had to the preferred embodiment, exemplary of the invention shown in the accompanying drawings, in which:

FIG. 1 is a functional block diagram of a ground fault sensor embodying the principal features of the invention and including input and output terminals adapted to be interconnected with those of associated ground fault sensors in an interlocking ground fault current sensor system;

DETAILED DESCRIPTION OF THE DRAWINGS

Figure 2A:
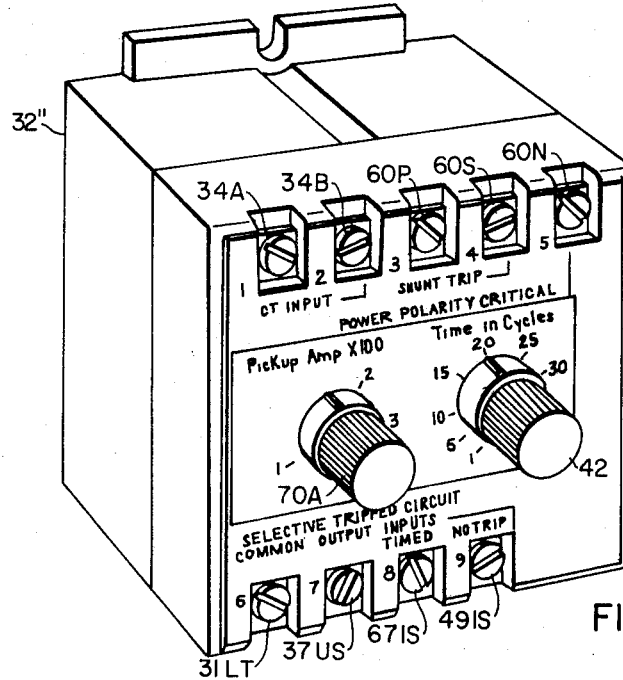
FIG. 2A shows a ground fault sensor with control means.

Referring now to the drawings and FIG. 1 in particular, an electrical transmission system 28 including a source of electrical power 12 and an electrical load or load circuit 14 is illustrated. This system is similar to those shown in copending applications, Ser. Nos. 176,114 and 175,880 (W.E. Case Nos. 42,111 and 42,729). Ground fault sensor 32'' includes a variable delay means 67 which in turn includes a variable delay disabler circuit 68' and an inhibitor circuit 69. The input terminal 67IS of the inhibitor circuit functional block 69 is also the input terminal for the variable delay disabler circuit 67. The output terminal 64' of the variable delay means 67 is connected to terminal 64 of variable delay circuit 40. The output terminal 69U of inhibitor circuit 69 is connected to the input terminal 68I of the variable delay disabler circuit 68'. The "Timed Trip Input Signal" terminal 67IS adapted to receive a signal from an external source or means which will cause inhibitor circuit 69 to prevent the operation of variable delay disabler circuit 68', which is normally energized by a separate input signal provided at output terminal 62 of voltage comparator 38, from affecting the operation of the variable delay circuit 40. Consequently, any predetermined or fixed time delay which may have been provided in the operation of the variable time delay circuit 40 through the adjustment of the time delay control 42 will be effective to delay the tripping of circuit breaker 250 after the sensing of a ground fault current by current monitor 30. This mode of operation occurs if terminal 67IS is energized by a proper energizing or control signal. The input signal which is provided to the variable delay disabler circuit 68' from the voltage comparator circuit 38 by way of terminal 62 may be provided from any suitable input electrical circuit such as electrical circuit 35.

The input electrical circuit 35 which includes the sensor signal conditioner circuit 36 and the voltage comparator circuit 38 may provide an input signal for an output remote signal generator 37. The output remote signal generator 37 has an "Output Signal" terminal 37US, the signal at which may be used to remotely affect the operation of other ground fault sensors or similar control devices. The output signal at terminal 37US is provided when the current monitor 30 senses a significant or predetermined ground fault current, regardless of whether output signal terminal 37US is connected to a remote or external load or not.

More specifically, the input signal to the output remote signal generator 37 is applied thereto from the output terminal 36A of the sensor signal condition 36.

Ground fault sensor 32" includes another functional circuit means, more specifically the switch disabler circuit 49. Switch disabler circuit 49 is adapted to receive input information or signal information or a signal from the "No-trip" input signal terminal 49IS. The switch disabler circuit 49 when energized or actuated provides a function whereby the operation of the output electrical circuit 43, is inhibited or prevented from operating to the extent that circuit breaker or interrupter 250 may not be tripped or contacts 250A, 250B, 250C and 250D remain opened regardless of the operating conditions in any other portion of the overall circuit of the ground fault sensor 32".

Ground fault sensor circuit 32" as just described is therefore adapted to receive external signals from other ground fault sensors such as 32" and to provide external signals to other ground fault sensors such as 32" thus forming the basic building block of a multi-sensor ground fault protection system or network.

Figure 2B:
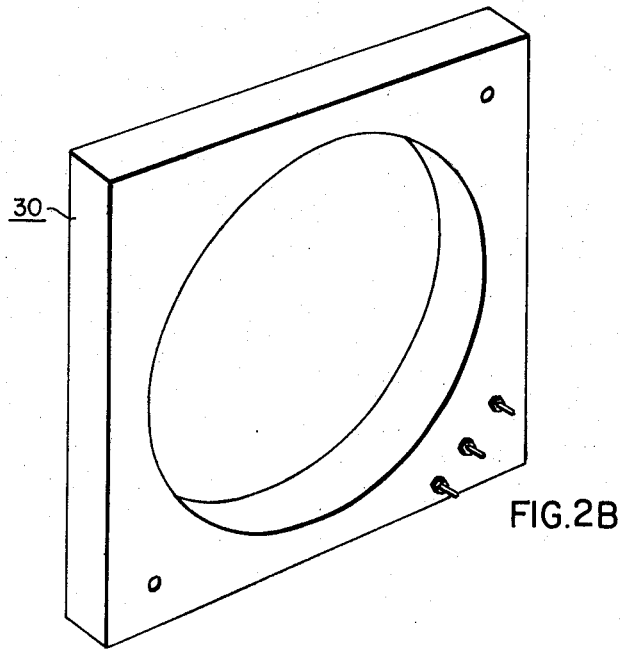
FIG. 2B shows a current monitor which may form part of the overall system.

Referring to FIGS. 2A and 2B, a current monitor 30 which may be the type shown used in FIG. 1 to sense ground fault current is shown. Also shown is ground fault sensor 32" including an adjustable sensitivity control means as indicated at 70A for fixing or determining the value of ground fault current which will cause the actuation or tripping of a curcuit breaker such as 250, shown in FIG. 1, for example and an adjustable delay control means as indicated at 42 which may vary the time delay for tripping a circuit breaker or interrupter which may be actuated by ground fault sensor 32". "CT Input" terminals 34A and 34B on the ground fault sensor 32" shown in FIG. 2A may be connected to output terminals of a current sensor or current monitor or current transformer 30 such as shown in FIG. 2B. The trip coil of a circuit breaker such as circuit breaker 250 shown in FIG. 1 may be connected between the "Shunt Trip" terminals 60P and 60S of the ground fault sensor 32" shown in FIG. 2A. In addition, terminal 60P may also act as a common terminal for a power supply means such as ground fault sensor power source 60 shown in FIG. 1, power source 60 may be connected at its other terminal to terminal 60N of ground fault sensor 32". Ground fault sensor source or power supply 60 may comprise an alternating current or Direct current energizing means which may range between 40 and 120 volts. The only limiting criterion being that the shunt trip coil in the circuit breaker 250 must be matched to or coordinated with the voltage and frequency of power supply 60. Input terminals 67IS and 49IS, output terminal 37US and common terminal 31LT of ground fault sensor 32" all of which were previously described are also shown in FIG. 2A.

Figure 3:
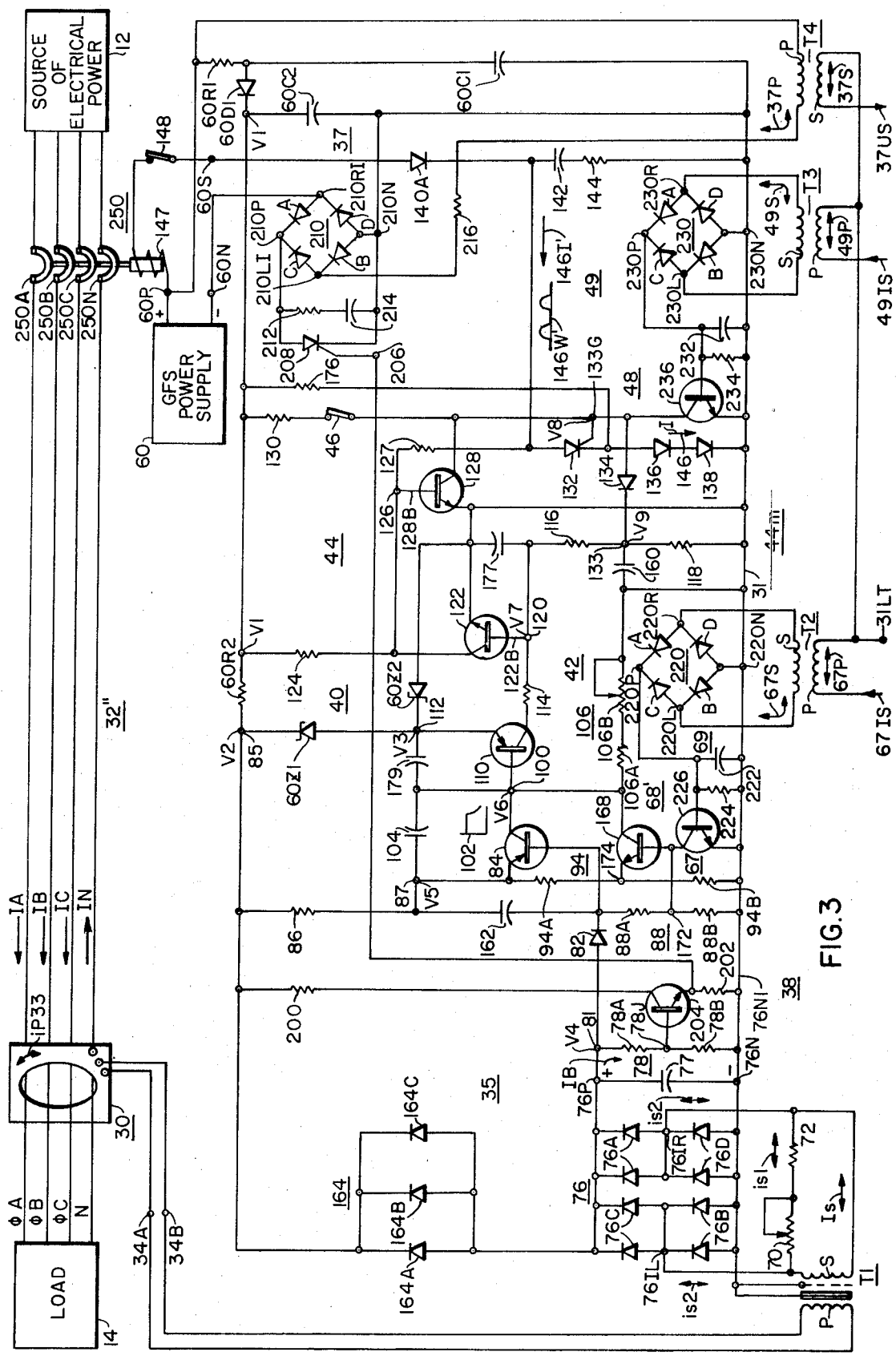
FIG. 3 shows a schematic circuit diagram of the ground fault sensor shown in block form in FIG. 1.

Referring now to FIG. 3, an electrical circuit or system which may represent, in detail, a schematic diagram of ground fault sensor 32" is shown. The connections to the source of power 12 and load circuit 14 are also indicated in FIG. 3. Phase currents IA, IB, IC are shown flowing in phase wires 0A, 0B, 0C, respectively, and neutral current IN is shown flowing in neutral wire N. In addition, circuit breaker contacts 250A, 250B, 250C and 250N are adapted to be actuated to the open positions to isolate the load circuit 14 from the source of power 12. In the event that a ground fault current is sensed by current monitor or loop current transformer 30, an induced primary alternating current IP33 flows into the primary winding terminals 34B and 34A of the primary winding P of isolation transformer T1. Consequently, a secondary current IS flows in the secondary winding S of transformer T1. Current IS comprises two components. One current component is IS1 which flows through resistors 72 and 70, which are serially connected across the secondary winding S of isolation transformer T1. Resistor or potentiometer 70 is adjustable or variable to provide a lower or higher resistive load for current IS so that the component of current IS1 flowing through resistors 70 and 72 may be made relatively larger or smaller for a particular value of ground fault current sensed by current monitor 30. The adjustable resistor or rheostat 70 may be known as a sensitivity control means. The second component of the current IS is current IS2 which flows into a full wave electrical bridge rectifier circuit 76 through input terminals 76 IL and 76 IR. Current IS2 may be made relatively larger or smaller in magnitude for generally the same magnitude of primary current IP33 by varying the resistance means 70. This circuit arrangement provides an output current IB which flows from positive output terminal 76P of bridge 76 to negative output terminal 76N of bridge circuit 76. Current IB, flowing through resistors 78, may produce or develop a sufficient magnitude of unidirectional current voltage V4 at point or junction 81 to actuate other portions of the ground fault sensor 32".

The magnitude of voltage V4 produced or developed by the current IB flowing through resistors 78 is regulated by filter capacitor 77 and may typically be of such a value that a ground fault current having a magnitude of five amperes, for example, may produce a value of current IP33 in the current monitor 30 which is sufficient to develop a value of voltage V4 at junction 81 which may cause the ground fault sensor 32" to actuate circuit breaker or circuit interrupter 250.

The output remote signal generator 37 includes resistor 78, which may comprise in series circuit combination a resistor 78A and resistor 78B having a common interposed junction 78J connected to the base of an NPN transistor 204. The emitter of transistor 204 is connected through a resistor 202 to the negative terminal 76N of the bridge rectifier circuit 76. The collector of transistor 204 is connected through a resistor 200 to terminal or junction 85 which is maintained at a voltage V2 which is approximately 15 to 16 volts (direct current). Under normal conditions, that is, when no ground fault current is detected by current monitor 30, transistor 204 is maintained in the "off" state in which no significant electrical current is conducted from the collector to the emitter. However, should a predetermined amount of ground fault current be detected or sensed by monitor 30, the unidirectional current voltage at terminal 78J between the resistors 78A and 78B due to the change in output current from the bridge circuit 76 will become sufficiently large to forward bias the base-to-emitter circuit of transistor 204 causing current to flow from terminal 85 through collector resistor 200, through the collector-to-emitter circuit of transistor 204 and through the emitter resistor 202 to the return or common conductor 31 and to the terminal 76N. The resulting voltage which is developed across emitter resistor 202 is applied to the gate 206 of a silicon controller rectifier or similar gated means 208 to actuate the silicon controlled rectifier or similar gated means 208 to turn "on" or to provide a conducting path for electrical current from its anode to cathode. The anode and cathode of silicon controlled rectifier 208 are connected to the output terminals 210P and 210N respectively as illustrated to a bridge circuit 210'. Terminal 60P of the source 60 of sensor circuit 32'' is connected through the primary winding P of transformer T4 and the resistor 216 to the input terminal 210LI of full wave bridge circuit 210. The other input terminal 210RI of bridge circuit 210 is connected to the other terminal 60N of the power source 60 of the ground fault sensor circuit 32''. When silicon controlled rectifier 208 is actuated to a state of conduction or turned on, a current carrying path results between the terminals 210LI and 210RI. This allows alternating current 37P to flow in the primary winding P of transformer T4. Resistor 212 and capacitor 214 are connected in series circuit relationship across the anode-to-cathode circuit of the silicon controlled rectifier 208. This combination of the resistive element 212 and capacitive element 214 serves a dual purpose. The first purpose is to filter the electrical current which flows from the output terminals 210P and 210N of bridge circuit 210 and the second purpose is to provide a surge or voltage suppression means for energy induced by high rates of voltage change with respect to time which may be electromagnetically coupled between the anode and cathode of silicon controlled rectifier 208 and which may cause it to spuriously turn on. The secondary winding S of transformer T4 is connected at one end to signal common terminal 31LT through common line 31L and at the other end to output terminal 37US. If an electrical load is connected between signal common terminal 31 and output terminal 37US, alternating current 37S will flow in the secondary winding S of transformer T4 which current may be used to energize a load. This current or signal may be considered as the output signal of the output remote signal generator 37.

When voltage V4 reaches a value which is sufficient to forward bias isolating diode 82, the normally conducting or turned-on transistor 84 will be turned off. Transistor 84 may be of the PNP type and have resistance means or resistor 86 connected to its emitter. The other end of resistor 86 is connected to a source of voltage V2 which may in turn be provided by a separate ground fault sensor power source 60. Voltage V2 may, be a highly regulated direct current voltage having a value of 15 volts, for example. Also connected to the emitter of transistor 84 is a resistive means or component 94 which may comprise a single resistive element or a pair of resistors or resistive elements 94A and 94B connected in series circuit relationship with one another, the other end of this combination may be connected to common line or bus 31. Connected to the base of the transistor 84 is the cathode of the previously mentioned isolating diode 82 and a base drive resistor 88 which may also comprise a pair of resistors 88A and 88B connected in series circuit relationship with one another and which may have the other end connected to bus 31.

Variable delay disabler circuit 68' as also shown in FIG. 1 includes on NPN transistor 168. The junction 172 between resistor 88A and resistor 88B is connected to the base of transistor 168. The junction 174 between resistors 94A and 94B is connected to the emitter of transistor 168. The collector of transistor 168 is conencted to one end of a combination timing and reset capacitor 104 and also to the collector of transistor 84 and to the base of transistor 110.

In the operation of the disabler circuit 68', the collector-emitter circuit of the transistor 168 is normally non-conducting in the absence of a predetermined ground fault current. Assuming that an inhibiting input signal is not applied to the terminals 67IS and 31LT of the inhibitor circuit 69, as will be described hereinafter, the transistor 168 will be actuated to a conducting condition in its collector-emitter circuit if a predetermined ground fault current forward biases the diode 82 and increases the voltage at the junction 172. If an inhibiting input signal is applied to the terminals 67IS and 31LT, the base of the transistor will be maintained at a voltage which is close to the voltage at the common line 31 and the transistor 168 cannot then be actuated to a conducting condition in response to a predetermined ground fault signal which may forward bias the diode 82 and increases the voltage at the terminal 172.

Connected between the emitter and collector of transistor 84 is the multi-purpose timing capacitor 104. The multi-purpose timing capacitor 104 may comprise a combination reset and timing means. Normally, electrical current flows from junction or conductor 85 through emitter resistor 86 and the resistor 94 (or resistors 94A and 94B), and to the common line 31. This current establishes a voltage V5 at junction 87 or at the emitter of transistor 84 which may be approximately 12 volts and which is positive with respect to the voltage at the common conductor 31. The voltage, V5, is sufficient normally to forward bias transistor 84 to an "on" state and cause current to flow into the base-drive resistor 88. Considering the voltage at the junction between the anode of the diode 82 and the resistor or resistors 88, as long as voltage V4 is insufficient to forward bias diode 82 and, consequently, turn "off" or actuate transistor 84 to a substantially non-conducting condition, then a virtual short circuit will be normally effective across the timing or reset capacitor 104 to prevent the charging thereof.

Junction point 100 is connected to common line 31 and to terminal 76N of bridge circuit 76 through a resistor or resistive element 106 which may comprise a pair of resistors 106A and 106B where the value of resistor 106B may be variable. When electrical current flows through resistor 106 (or the pair of resistors 106A and 106B), the voltage V6 at junction point 100 is substantially equal to voltage V5, the difference being the emitter-to-collector voltage drop across transistor 84. But when transistor 84 is turned off or actuated to a substantially non-conducting condition due to the forward biasing of the diode 82, then current flow to the resistive means 106 from the collector of transistor 84 is negligible and voltage V6 changes. But voltage V6 is constrained to not change instantaneously because of the time required for capacitor 104 to charge. Assuming that the transistor 168 is substantially non-conducting due to the presence of an inhibiting signal at the terminals 67IS and 31LT of the inhibitor circuit 69, the R-C time constant for charging capacitor 104 is determined by the values of capacitor 104 and resistors 86, 106A and 106B and may be varied by changing the value of resistor 106B which is adjustable or variable. As capacitor 104 charges, voltage V6 at junction point 100 changes toward the voltage value of common conductor 31 which may be substantially zero volts. If V4 subsequently decreases to a value which results in the forward biasing of transistor 84 again before the end of a predetermined time delay then capacitor 104 quickly discharges or resets through the collector-to-emitter circuit of transistor 84. If the transistor 168 is actuated to a conducting condition at the same time as the transistor 84 is turned "off" assuming there is no inhibiting signal at the terminals 67IS and 31LT, the change in the voltage V6 at junction 100 will occur almost instantaneously as described in detail in copending application Ser. No. 176,114 (W.E. Case 42,111).

Junction point 100 is also connected to the base of a second transistor 110. Transistor 110 is normally "off" or substantially non-conducting when voltage V6 is higher than the voltage V3 at the junction 112 or emitter of the PNP transistor 110. However, as the value of voltage V6 approaches the value of the voltage at the common conductor 31, transistor 110 is turned "on" or actuated to a saturated condition and current flows from the voltage source indicated at V3 through the emitter-to-collector circuit of transistor 110 and the resistors 114, 116 and 118, to the common terminal or bus line 31. Voltage V3 may, for example, be a direct current voltage of approximately 6.8 volts which is positive with respect to the voltage at the terminal 76N or common line 31. As current flows through the resistors 114, 116, 118, voltage values are established or result at junction points 120 and 133 respectively which are indicated as voltages V7 and V9, respectively.

Junction point 120 is connected to the base 122B of a third transistor 122 which is also normally in the "off" or substantially non-conducting state because voltage V7 at base 122B is very low or near the voltage value of line 31, relative to the voltage V1. Consequently, current from voltage source V1 flows through resistor 124 into the base 128B of the normally "on" or saturated transistor 128 and through the base-to-emitter circuit of transistor 128 to the system common conductor 31. This base drive current normally forward biases or maintains transistor 128 in a conducting state. However, should the value of voltage V7 rise, such as in the case when transistor 110 is turned "on", the collector-to-emitter circuit of transistor 122 may also be actuated to a conducting or "on" state. Consequently, some of the current which had previously been flowing into the base 128B of transistor 128 may be shunted through or transferred to the collector-to-emitter circuit of the newly conducting transistor 122. As a result, transistor 128 ceases to conduct or is actuated to a substantially non-conducting or "off" condition because of the loss of base drive current. When transistor 128 ceases to conduct, current flowing from voltage source V1 through resistor 130, the closed switch 46 and the collector-to-emitter circuit of transistor 128 to common line 31 ceases to flow or decreases to a negligible value. Therefore the voltage V8 at gate terminal 133G of gating means or switch 132 increases in value because the voltage drop across the resistor 130 due to current flowing through resistor 130 substantially decreases. An increase in voltage V8 energizes gate 133G and causes silicon controlled rectifier (SCR) Triac or gated static switch 132 to conduct electrical current from an available source through its anode-to-cathode circuit and through diodes 136 and 138 to the common line 31 or negative terminal 76N of bridge circuit 76. This current may flow into the last-mentioned anode from the voltage source V1 through resistor 124 and resistor 127 which are connected in series circuit relation with the anode of the SCR 132. The anode of the silicon controlled rectifier 132 is also connected to the diode 140A. The actuating or turning on of silicon controlled rectifier or thyristor 132 in effect completes an additional circuit or current carrying path between the two output terminals of Power Source 60 and allows current to flow through circuit breaker trip coil 147 and the diode 140A to energize the coil 147 and to actuate circuit interrupter 250 to open.

Presuming that no input signal is present at the terminal 67IS and that variable delay means or enabler circuit 67 has been actuated by a ground current signal so as to operatively or effectively connect the emitter of variable delay disabler transistor 168 to junction point 100 or in other words that a sufficient amount or value of voltage is provided at junction 172 through the voltage divider 88 to overcome the relatively fixed or predetermined voltage present at terminal 174 and consequently forward bias transistor 168 which is normally non-conducting, then the right end of capacitor 104 as illustrated or junction point 100 will be effectively connected to system common line 31 through the collector-to-emitter circuit of transistor 168 and the relatively small resistor or resistance means 94B. The value of resistor 94B is selected to be relatively small compared with the total resistive value provided by the serially connected resistors or resistive elements 106A and 106B of resistive element or resistor 106. Consequently, capacitor 104 quickly charges to the voltage potential present at common line 31 which may be substantially zero. The rate of charging of capacitor 104 is relatively fast so as to be almost instantaneous. Consequently, transistor 110 is turned "on" almost instantaneously and the functions which have previously been described and which follow from the turning "on" of transistor 110 and which culminate in the opening of circuit interrupter 250 occur rapidly so that circuit breaker 250 causes or actuates contacts 250A, 250B, 250C and 250N to open almost instantaneously after a ground fault current has been sensed by sensing means or monitor 30.

In the event that the operation of the disabler circuit 68' of variable delay means 67 is inhibited by an input signal applied at the terminals 67IS and 31LT, so that there can be substantially no electrical continuity or circuit established between junction 100 and common line 31 as just described, circuit 32" will operate in response to a predetermined ground current signal to provide a predetermined time delay before turning on transistor 110 in a manner which is described in detail in copending application, Ser. No. 175,880 (W.E. Case No. 42,729).

The variable resistor 106B used in combination with resistor 106A, resistor 86, and capacitor 104 may be varied so as to provide time delays in a predetermined range which may extend between the time represented by 5 cycles of an alternating current electrical system and the time represented by approximately 40 cycles. However, the actuation of the variable delay disabler circuit 68' may for example reduce the operating time to less than the time represented by one cycle in a similar alternating current electrical system.

In order to provide a memory means 44m for circuit 32", the previously mentioned increase in voltage V8 at gate or terminal 133G may be fed through a forward biased diode 134 to junction point 133. The voltage at junction point 133 indicated by V9 increases in voltage value. This increase in the value of voltage V9 is reflected through resistor 116 to junction point 120 causing voltage V7 to increase proportionally or in some other relationship. Consequently, the base 122B of transistor 122 is further forward biased regardless of what may happen in the previously mentioned associated preceding stages of the overall circuit 32", and the gate voltage V8 at terminal 133G is once again lowered or decreased and the silicon controlled rectifier 132 remains conducting until a normally closed reset means 46 which includes means for operatively disconnecting power source V1 from gate 133G is actuated to the open position. Operation of the latter reset means also causes a reset of the memory means 44m. In this particular embodiment, current 146I' which flows into the anode of the silicon controlled rectifier 132 comprises a half wave, rectified electrical current, as illustrated by wave shape or pulse train 146W'. The ground fault sensor power supply 60 may provide sixty hertz, alternating current voltage of any desired value.

Power supply 60, as illustrated, has a first terminal 60P which may be instantaneously positive, as indicated and a second terminal 60N which may be instantaneously negative, as indicated. The anode of the silicon controlled rectifier 132 is connected to terminal 60S through a diode 140A with the anode of the diode 140A being connected to terminal 60S and the cathode thereof being connected to the anode of silicon controlled rectifier 132. Terminal 60S is connected through a switch 148 to the shunt trip coil 147 of circuit breaker or interrupter 250. The other end of shunt trip coil 147, as illustrated, is connected to the terminal 60P of the power supply 60 which is indicated as being instantaneously more positive. The return path to power supply 60 is through diodes 136 and 138 and diode 210D of the bridge circuit 210 to the instantaneously more negative terminal 60N of the ground fault detector power supply 60. Trip coil 147 must be suitably chosen to suit or coordinate with the power and voltage provided by current 146I'.

The inhibitor circuit 69 of the delay enabler means or circuit of the ground fault sensor circuit 32" shown in FIG. 3 comprises a bridge rectifier circuit 220, the output of which is connected to a resistor 224 and capacitor 222 which are connected in parallel circuit relationship. The base of a transistor 226 is connected jointly to one end of resistor 224, one end of capacitor 222 and the positive output terminal 220P of full wave rectifier bridge circuit 220. The emitter of transistor 226 is connected jointly to the other end of resistor 224, the other end of capacitor 222, the negative terminal 220N of full wave bridge rectifier circuit 220 and the common bus 31. Terminal 220N is also connected to the negative terminal 76N of bridge circuit 76. The collector of transistor 226 is connected to the base of the previously mentioned "inhibitor" transistor 168. The input terminals 220L and 220R of bridge circuit 220 are connected to the secondary winding S of a transformer T2. If an alternating current 67S flows in the secondary winding S of transformer T2, a unidirectional current voltage results between positive output terminal 220P of bridge circuit 220 and negative output terminal 220N, which voltage may be made sufficiently large to forward bias the normally substantially non-conducting or "off" transistor 226 and thus operatively connect the base of transistor 168 to the negative output terminal 76N of the bridge circuit 76, through the collector-to-emitter circuit of transistor 226. When the base-emitter circuit of transistor 226 is forward biased, transistor 168 becomes reverse biased or turned off. As a result, terminal 100 at the junction point between the collector of transistor 84 and the base of transistor 110 will not be effectively connected to terminal 76N through the collector-to-emitter circuit of transistor 168 and the resistor 94B and the normal timing operation as controlled by the timing capacitor 104 and resistive elements 86, 106A and 106B will be allowed to start or continue. Therefore any predetermined time delay which is set or adjusted through the use of the adjustable resistor or resistance means 106B will cause the tripping of circuit breaker 250W to be delayed by a predetermined time period after the sensing of a ground fault current by current monitor 30. The primary winding P of transformer T2 is connected at one end to the signal common terminal 31LT and at the other end to the input terminal 67IS. If a current 67P flows in the primary winding P of transformer T2 due to the application of a remote energizing or control signal between terminal 67IS and common terminal 31, the ground fault sensor circuit 32" will be enabled or permitted to time out or delay the actuation of circuit breaker 250 shown in FIG. 3 according to the adjusted delay setting of adjustable rheostat 106B. Otherwise, current breaker 250 will be actuated to trip almost instantaneously upon the sensing of a predetermined ground fault current.

The switch disabler circuit 49 as shown in FIG. 3, comprises circuit elements similar to the circuit elements previously discussed with respect to the variable delay enabler circuit 67. The switch disabler circuit 49 includes an input bridge rectifier circuit 230 having a positive output terminal 230P and a negative output terminal 230N. Connected to the positive output terminal 230P of bridge circuit 230 are one end of the capacitor 232, one end of the resistor 234 and the base of the transistor 236. Connected to the negative output terminal 230N of bridge circuit 230 is the other end of capacitor 232, the other end of resistor 234 and the emitter of transistor 236. The negative output terminal 230N of the bridge circuit 230 is also connected to the negative terminal 76N of the input bridge circuit 76 through the bus 31. The collector of transistor 236 is connected to the gate 133G of silicon controlled rectifier 132. The input terminals of full wave rectifier bridge 230 are terminals 230L and 230R. The opposite ends of the secondary winding S of transformer T3 are connected to terminals 230L and 230R so that an alternating, pulsating or time varying current 49S may flow as indicated in FIG. 3. When current 49S flows, a sufficient positive voltage may result at terminal 230P of bridge circuit 230 to cause transistor 236 to conduct thus effectively connecting the gate terminal 133G of silicon controlled rectifier 132 to the negative terminal 76N of the input bridge circuit 76. Consequently, any other sensor system operation which might otherwise attempt to positively bias the gate 133G of silicon controlled rectifier 132 will be ineffective. In other words, silicon controlled rectifier 132 cannot be actuated to a conductive state when current 49S flows in the secondary winding S of transformer T3. The primary winding P of transformer T3 is connected at one end to the signal common bus 31L and at the other end to the input terminal 49IS. If sufficient input signal strength is provided between terminal 49IS and system common terminal 31L, a current 49P flows in the primary P of transformer T3 and the secondary current 49S is induced in the secondary winding S.

It will be noted that the ground fault detector power source 60 may also supply the power to provide voltages V1, V2 and V3 of the ground fault detector 32″ and it also should be noted that it is possible for the ground fault detector power source 60 to have a voltage range between 40 and 120 volts ("AC or DC") and actuate the components of ground fault detector 32″ as well as to energize the shunt trip coil 147. Voltages V1, V2 and V3 which were previously mentioned may be direct or unidirectional current voltages having values of approximately 110 volts, 15 volts and 6.8 volts, respectively. The terminal 60P of power source 60 is also connected to a resistor 60R1 which is connected at its other end to a diode 60D1 and a storage capacitor 60C1. If the power source 60 supplies a direct current voltage, diode 60D1 may be forward biased and capacitor 60C1 charged to near the peak value of voltage present at the terminal 60P of ground fault detector power source 60. This voltage may be, for example, 40 volts (direct current). If the source 60 supplies alternating current, then only positive fluctuating half cycles will be present at the cathode of diode 60D1. The cathode of diode 60D1 is connected to a second capacitor 60C2 which acts as a combination filter capacitor and energy storage capacitor. It will be noted that voltage V1 may be regulated less effectively in the case of an alternating current source of power 60. The source 60 is nevertheless effective to provide power through resistor 60R2 to energize Zener diodes 60Z1 and 60Z2 to produce highly regulated values of voltages V2 and V3, at terminals or junctions 85 and 112, respectively.

A capacitor 142 and a resistor 144 are connected in series circuit relationship across or in parallel with the series circuit which includes the silicon controlled rectifier or gated valve 132 and diodes 136 and 138. The capacitor and resistor combination which includes the capacitor 142 and the resistor 144 serves a dual purpose. First, it prevents a spurious anode turn-on or triggering of the silicon controlled rectifier 132 when a high rate of voltage change with respect to time is impressed across the anode-to-cathode circuit of silicon controlled rectifier 132, because the capacitor 142 and resistor 144 suppress relatively high values of voltage rise with respect to time. Second, since the capacitor 142 and resistor 144 are also connected in series with the anode of diode 140A they act as a filter network for any fluctuating component of current 146I′. Capacitors or capacitive elements 162, 179, 177 also act as voltage spike suppression capacitors for transistors 84, 110 and 122 respectively. Capacitor or capacitive element 160 also acts as a voltage spike suppression means.

Bridge circuit 76 may comprise parallel diode pairs 76A, 76B, 76C and 76D. These diodes may be arranged in parallel pairs to accommodate large values of current in the bridge circuit or full wave rectifier means 76. Parallel diode array 164 associated with the bridge circuitry 76 may comprise a plurality of diodes 164A, 164B, and 164C arranged in parallel circuit relationship. The respective anodes of each of the named diodes are connected to the positive terminal 76P of bridge circuit 76 and the cathodes are connected to the regulated voltage source V2 at junction point or terminal 85. These diodes provide a high current short circuit path into voltage source V2 should the value of V4 rise to such a high value as to endanger transistor 84 with excessive reverse base-to-emitter voltage. Diode array 164 therefore may act as a voltage regulation means during certain operating conditions for the positive terminal 76P of bridge 76.

Figure 4:
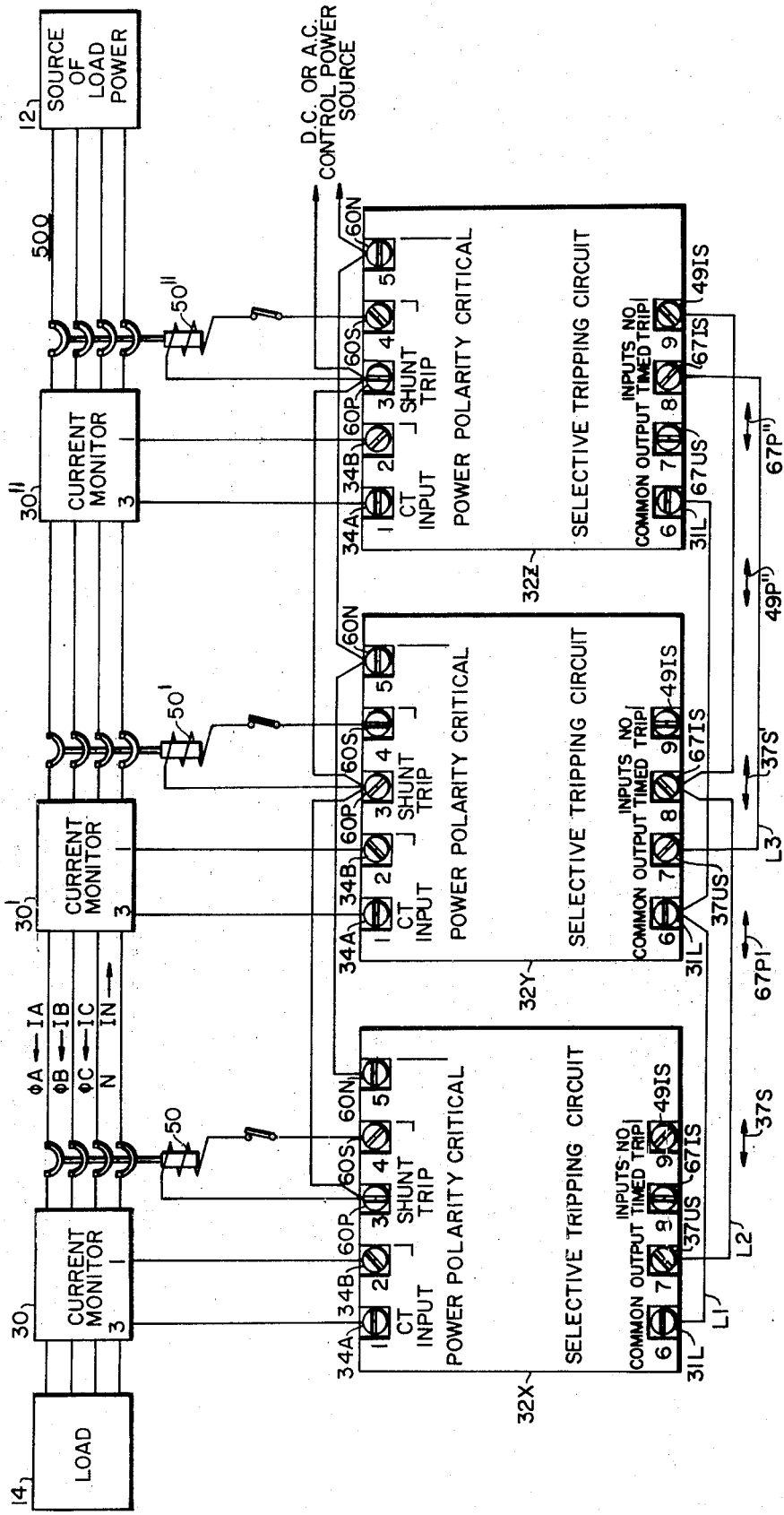
FIG. 4 shows an electrical transmission system and an associated ground fault detecting system including current monitors, circuit breakers and interconnected ground fault sensors.

Referring now to FIG. 4, a transmission system comprising a power source or source of load power 12 which may be of the three phase or polyphase wye connected type with a grounded neutral terminal and a load circuit 14 which also may be of three-phase wye connected type with a neutral terminal connected through a conductor to the neutral terminal of source 12 is shown. As illustrated, the system includes three current monitors 30, 30′, and 30″ along with three associated circuit breakers or interrupters 50, 50′ and 50″, respectively, each of said circuit breakers having separable contacts and a shunt trip coil. In addition, the system includes three ground fault sensors designated 32X, 32Y, and 32Z, respectively. The output of each of the current monitors 30, 30′ and 30″ is connected to the monitor input terminals 34A and 34B of the respective ground fault detectors 32X, 32Y, or 32Z. The shunt trip coils of each of the circuit breakers 50, 50′ and 50″ are connected between terminals 60P and 60S of the sensors 32X, 32Y and 32Z, respectively. Electrical power, which may vary from 40 to 120 volts (AC or DC) is applied between terminals 60P and 60N of each of the three ground fault sensors or detectors 32X, 32Y and 32Z.

In considering the operation of the system shown in FIG. 4, it is assumed that ground fault detector 32X has no input signals applied at terminals 67IS or 49IS, but there is an output signal present between system common terminal 31L and output terminal 37US. System common terminal 31L of detector 32X is connected to a conductor L1 which is connected to similar system common terminals in ground fault sensors 32Y and 32Z, respectively. The output terminals 37US of sensor 32X is connected to the timed input terminal or timed input signal terminals 67IS of ground fault detector 32Y and 32Z respectively. The output terminal 37US of detector 32X is connected to the timed inputs or timed input signal terminals 67IS of ground fault detector 32Y and, through line L2, also to the no-trip input or no-trip input signal terminal 67IS of ground fault detector 32Z. In addition, ground fault detector 32Y has its output terminal 37US connected through line L3 to the timed input or timed tripped input signal terminal 37IS of the ground fault detector 32Z. Consequently, should current monitor 30, for example, sense a predetermined value of ground fault current, a signal will be provided from sensor 32X to sensor 32Y causing sensor 32Y to delay the tripping action of circuit breaker 50' even through the circuit breaker 50 which is associated with sensor 32X is actuated to trip open immediately. In addition, the output signal from the sensor 32X which is provided at terminals 31L and 37US is applied to sensor 32Z at terminal 31L and 49IS to prevent sensor 32Z from actuating the tripping of circuit breaker 50 under any circumstances. It should also be noted that if a predetermined ground fault current is also sensed by current monitor 30L sensor 32Y will provide an output signal to sensor or ground fault detector 32Z to the timed input terminal 67IS thus allowing sensor 32Z to begin its timing cycle should it also sense a predetermined ground fault current through current monitor 30''. Of course as was mentioned previously, none of the operations within sensor 32Z will cause circuit breaker 50'' to trip when a no-trip signal is applied to sensor 32Z from sensor 32X. However, should sensor 32X be inadvertently damaged or should sensor 32X not operate normally for any reason, the output signal which is provided to the no-trip input of sensor 32Z will no longer be present and the sensor 32Z will respond to a predetermined level of ground fault current and actuate circuit breaker 50'' to trip after the normal timing for delay provided in the operation of sensor 32Z has elapsed.

Referring once again to FIG. 1 the ground fault sensor 32'' may be considered as being composed of basic control logic blocks interconnected to perform logic functions. For example, in one sense, inhibitor 69 may be considered as comprising in part a "NOT" logic function block, variable delay disabler 68' may be considered as comprising in part an "AND" logic functional block, variable delay 40 may be considered as comprising in part an "OR" logic functional block, switch 48 may be considered as comprising in part an "AND" logic functional block and switch disabler 49 may be considered as comprising in part a "NOT" logic functional block.

Consequently, if "AND" 48 has not been disabled by the presence of a signal at terminal 49IS then circuit breaker 250 may be activated to the open position by an output signal from voltage comparator 38 which has been delayed by a portion of timing circuit or variable delay 40 or circuit breaker 250 may be actuated open almost instantaneously by the presence of a signal at output terminal 62 of voltage comparator 38 and a disabling of the variable delay by the variable delay disabler 68' provided variable delay disabler or "AND" portion 68' has not itself been disabled by the presence of a signal at terminal 67IS which may actuate or engage "NOT" or inhibitor circuit 69. Circuit breaker 250 will not be actuated if "NOT" element 49 is actuated.

It is to be understood that the current monitor 30 may actually comprise or include a plurality of current monitors, one of each line conductor or neutral conductor in the multi-phase or polyphase system. The outputs of such a plurality of current monitors may be summed at a summing point. It is also to be understood that, in practice, the ground fault detector may sense ground faults in a perfectly or nearly perfectly balanced three-phase system in which the neutral wire designated N is not included within the periphery of the current monitor 30. In addition, it is to be understood that the source of power 12 in the associated load circuit 14 may be adapted to any of the common types of electrical connections, such as a delta connection for both or the wye connections for both, or a combination of both types of connections. Multi-phase or polyphase systems which include more than three phases may also be monitored. It is also to be understood that the circuit interrupted included in an overall system, such as circuit breaker 50, need not necessarily have a separate set of contacts to disconnect the neutral lead as is shown in the drawings. In addition, it is to be understood that the current monitor and associated ground fault detector system may be used or utilized to detect other types of electrical system faults than ground faults. For example, a fault at a system common member, such as the outer housing or shell of protective bus duct, may also be detected by a ground fault detection system as disclosed. It is also to be understood that the reset means 46 of the switch actuator 44 may be a mechanical reset means or an electrical reset means or it may be reset merely by disconnecting the switch actuator 44 from its source of electrical energy 60. In addition, it is to be understood that the switch actuator with memory 44m may comprise a digital memory system or an analog memory system or a mechanical memory system or any combination of these. In addition, any and all of the functional sections, such as the sensor signal conditioner 36, the voltage comparator 38, the variable delay 40 and so on, may be of the electromechanical variety, or of the digital variety, or of the analog variety or may comprise what is commonly known as software means such as punched tape, so that a digital computer may perform any of all of the functions described with respect to each of the functional blocks. It is also to be understood that the energy available at the output signal terminal 37US may be capable of providing energy to many other ground fault sensors or other monitoring or control circuitry simultaneously. It is also to be understood that the output terminal 37US and the two input terminals 37IS and 49IS need not necessarily be transformer coupled to remote or externally located electrical means, but may be directly coupled to them. It is also to be understood that the particular detector circuit arrangement as shown in FIG. 4 need not be necessarily limited to the arrangement shown there but may be used in various other input-output combinations which are limited only by the total number of possible input and output arrangements of a multi-detector system. It is also to be understood that the ground fault sensor such as 32" may be used with other types of zero sequence phase detectors such as electrical networks or filters rather than current transformer 30.

The apparatus embodying the teachings of this invention has several advantages. One advantage lies in the fact that the ground fault sensor is adapted to be incorporated into a system of ground fault sensors and peripheral monitoring and control equipment or means such that ground faults may be more effectively isolated to small areas without affecting remaining parts of the overall electrical transmission system. This is done by transmitting or providing delay and inhibiting signals among ground fault sensors in the same system to provide interlocking signals or functions among the sensors.

We claim as our invention:

1. Electrical protective apparatus for responding to ground fault electrical current in an electrical transmission system and for actuating a circuit interrupter to open upon the occurrence of predetermined operating conditions including, separable contacts which form part of the transmission system comprising first means for obtaining an output current which varies with the ground current in said system, second means connected to said first means for producing a first output signal when said ground current exceeds substantially a predetermined value, a time delay means connected to said second means for producing a second output signal after substantially a predetermined time delay upon the occurrence of said first output signal, a disabling means connected to said time delay means for actuating said time delay means to produce said second output signal substantially instantaneously upon the occurrence of said first output signal, an output remote signal generator circuit connected to said first means, and a switching means connected to said time delay means and adapted to actuate said circuit interrupter to open said contacts in response to said second output signal, said output remote signal generator being adapted to provide an additional output signal which may be used to actuate a control function at a remote location, said output remote signal generator being adapted to provide said output signal to said remote location when said predetermined value of ground current is sensed by said second means of said electrical apparatus, a delay enabler circuit connected to said disabling means, said delay enabler circuit being adapted to respond to an external enabling signal applied thereto to allow the actuation of said circuit interrupter to open said contacts at substantially said predetermined time after said predetermined value of ground current has been sensed, said apparatus actuating said circuit interrupter to open said contacts substantially instantaneously after said predetermined ground current has been sensed in the absence of said external enabling signal, a switch disabler circuit which upon application of an external disabling signal thereto prevents said switching means from actuating said circuit interrupter open by said contacts of said circuit interrupter.

2. The combination as claimed in claim 1 wherein said additional output signal my be selectively applied as either an applied external enabling signal or an external disabling signal.

3. A ground fault protective system adapted for use with a polyphase alternating current system comprising current transformer means for driving an output current which varies with the ground current in said system, an input electrical circuit having an input connected to said current transformer means and having output terminals for producing a first output signal at said output terminals when said ground current exceeds a predetermined value, a time delay means having an input connected to said output terminals of said input circuit and output terminals for producing a second output signal at said output terminals after a predetermined time delay upon the occurrence of said first output signal, an output circuit having an input connected to the output terminals of said time delay means and output terminals for producing a third output in response to said second output signal, a delay enabler circuit including a delay disabler circuit having an input connected to said input electrical circuit and an output connected to said time delay means for normally producing an additional output signal when said input electrical circuit produces said first output signal, said additional output signal being effective to actuate said time delay means to produce said second output signal substantially instantaneously upon the occurrence of said first output signal, said delay enabler circuit including an inhibitor circuit connected to said delay disabler circuit and adapted to respond to an external enabling signal to prevent said disabler circuit from producing said additional output signal when said input electrical circuit produces said first output signal to thereby insure that said time delay means produces said second output signal only after said predetermined time delay upon the occurrence of said first output signal, and a disabler circuit connected to said output circuit and having an input adapted to receive a disabling signal, said output circuit being prevented from producing said third output signal when said disabling signal is applied to the input of said disabler circuit.

4. The combination as claimed in claim 3 wherein an output remote signal generator is connected to said input electrical circuit and has an output for producing a further output signal when said input electrical circuit produces said first output signal, said output signal being adapted to selectively act as either an external enabler energizing signal or a remote external disabler energizing signal.

5. The combination as claimed in claim 4 wherein said input electrical circuit comprises a sensor signal conditioner circuit and a voltage comparator circuit connected to said sensor signal conditioner, said output electrical circuit comprises a switch actuator circuit and an electrical switching circuit, said disabler circuit being adapted to control the operating condition of said electrical switch, said sensor signal conditioner having an input for receiving said output current from said current transformer means and being adapted to provide an output voltage signal which varies with the magnitude of said ground current, said output voltage signal being applied concurrently to said output remote signal generator to actuate said remote signal generator to provide said further output signal to said remote location and to said voltage comparator, both said output remote signal generator and said voltage comparator being so activated when said output voltage of said sensor signal conditioner exceeds substantially a predetermined value corresponding to said predetermined value of ground current to produce said further output signal and said first output signal, respectively, said variable time delay means being adapted to actuate said time delay means to produce said second output signal to actuate said switch actuator circuit to produce a switch actuator output signal when said voltage comparator circuit produces said first output signal.

6. The combination as claimed in claim 5 wherein said switch actuator circuit includes a memory means and a reset means connected to said memory means so that once said switch actuator circuit has been actuated to produce a switch actuator output signal said switch actuator circuit continues to generate said switch actuator output signal until reset by said reset means.

7. The combination as claimed in claim 6 wherein said time delay means is adapted to provide said switch actuator circuit with said second output signal substantially concurrently with the sensing of said ground current when said inhibitor circuit is not actuated by said external enabling signal, said time delay means providing said switch actuator circuit with said second output signal after substantially a predetermined time delay upon the occurrence of said first output signal only if said delay disabler circuit has been prevented by said delay disabler inhibitor circuit from producing said additional output signal, said delay disabler inhibitor circuit being adapted to be actuated to an inhibiting operating state by the application of said external enabling signal.

8. The combination as claimed in claim 7 wherein said sensor signal conditioner circuit includes first and second output terminals between which said output voltage signal appears, said remote signal generator including first and second input resistors, said first and second input resistors being connected in series circuit relationship between said first and second output terminals of said sensor signal conditioner circuit, said series circuit having an interposed junction terminal between said resistors, a first transistor having a base terminal, a collector terminal and an emitter terminal, the latter two terminals forming a collector to emitter circuit, a collector resistor and an emitter resistor; said base terminal of said first transistor being connected to said interposed junction terminal, said emitter terminal being connected to said emitter resistor and said collector terminal being connected to said collector resistor, a first source of power with positive and negative output terminals, said emitter resistor, said collector resistor and the collector to emitter circuit of said first transistor being connected in circuit relation with and energized by said first source of power, a first gated four layer solid state device having an anode, a cathode and a gate terminal, said gate terminal being electrically connected to said collector of said first transistor, a full wave bridge rectifier circuit having a plurality of diodes each capable of conducting electrical current in a forward direction, said bridge circuit including positive and negative output terminals, and first and second input terminals, a first load means, a second source of power with first and second output terminals, said first output terminal of said second source of power being connected through said first load means to said first input terminal of said bridge circuit, said second output terminal of said second source of power being connected to said second input terminal of said bridge circuit, said positive output terminal of said bridge circuit being connected to said anode of said four layer solid state device, said negative output terminal of said bridge circuit being connected to said cathode of said four layer solid state device whereby as said sensor signal conditioner output voltage signal increases said base of said first transistor becomes forward biased and said first transistor conducts substantial electrical current from said collector terminal to said emitter terminal causing the voltage at said emitter terminal to increase to a value sufficient to energize said gate of said four layer solid state device causing said four layer solid state device to conduct electrical load current from said first terminal of said second source of power through said first load means through a first forwardly conducting diode of said circuit bridge, through said four layer solid state device from anode to cathode, through a second forwardly conducting diode of said bridge circuit to the second terminal of said second source of power, said current which flows in said first load means generating said output remote signal.

9. The combination as claimed in claim 8 wherein said first load means includes a transformer having primary and secondary windings, said secondary winding having first and second output terminals, said primary winding being connected electrically between said first terminal of said second source of power and the first said forwardly conducting bridge diode, said output remote signal when present being available between said first and second output terminals of said second winding, said gated four layer solid state device comprising a silicon controlled rectifier.

10. The combination as claimed in claim 8 wherein said sensor signal conditioner circuit includes a pair of output terminals, a system common potential conductor is connected to one of the sensor signal conditioner circuit output terminals, said delay disabler circuit includes a second transistor having a base terminal, an emitter terminal, a collector terminal, and a collector-to-emitter circuit, one of said output terminals of said time delay means being connected to said system common conductor through a resistive element, and the collector to emitter circuit of said second transistor, said inhibitor circuit having a first terminal, said base of said second transistor being connected to said first terminal of said inhibitor circuit, said emitter of said second transistor being connected to one end of said last-mentioned resistive element, said collector of said second transistor being connected to said one of said output terminals of said time delay means, when said inhibitor circuit is not energized by said enabler energy signal said second transistor being forward biased to effectively connect said one of said output terminals of said time delay means to said system common conductor through the conducting collector-to-emitter circuit of said second transistor and the last-mentioned resistive element, said second output signal of said time delay means being provided to said switch actuator circuit substantially instantaneously upon the sensing of said predetermined value of ground current.

11. The combination as claimed in claim 10 wherein said inhibitor circuit includes a third transistor having base, collector and emitter terminals, said first terminal of said inhibitor circuit comprising said collector terminal, a second full wave bridge rectifier circuit and a first input means, said second bridge rectifier circuit having positive and negative output terminals and an input terminal, said positive output terminal of said second bridge circuit being connected to the base terminal of said third transistor, said negative output terminal being connected to the emitter of said third transistor, said first input means being connected to said input terminals of said second bridge rectifier circuit.

12. The combination as claimed in claim 11 wherein said first input means comprises a second transformer with primary and secondary windings, said secondary winding being connected to said input terminals of said second bridge circuit, said primary winding being adapted to receive said external enabling signal.

13. The combination as claimed in claim 8 wherein said circuit interrupter includes a shunt trip coil, said switch comprises a second gated four layer solid state device having anode, cathode and gate terminals, a second switch and a diode connected in series circuit relationship, one end of the shunt trip coil of said circuit interrupter being connected through said latter mentioned diode and said second switch to the anode of said second four layer solid state device, the other end of said shunt trip coil being connected to said first terminal of said second source of power, the cathode of said second four layer solid state device coil being adapted to be connected to the second terminal of said second source of power, when said second four layer solid state device is energized at said gate, a circuit including said shunt trip coil is completed and said shunt trip coil is energized, said disabler circuit comprising a fourth transistor with base, collector and emitter terminals, a third full wave bridge rectifier circuit and a second input means, said third bridge rectifier circuit and a second input means, said third bridge rectifier circuit having positive and negative output terminals and first and second input terminals, said positive output terminal of said third bridge circuit being connected to the base terminal of said fourth transistor, said negative output terminal of said third bridge circuit being connected to the emitter terminal of said fourth transistor, said collector terminal of said fourth transistor being connected to the gate terminal of said second gated four layer solid state device, a system common conductor is provided, said last mentioned emitter terminal being connected to said system common conductor, said second input means being connected to said input terminals of said third bridge circuit and being adapted to transfer said external switch disabling signal through said bridge circuit to forward bias and fourth transistor to effectively connect said gate of said second four layer gated solid state device to said system common conductor to prevent said second four layer solid state device from conducting substantial electrical current through said shunt trip coil.

14. The combination as claimed in claim 13 wherein said second input means comprises a third transformer having primary and secondary windings, said secondary winding being connected to said input terminals of said bridge circuit, said primary winding being adaptable to receive said external disabling signal.

* * * * *